US009919976B1

(12) United States Patent
Joblin, Jr. et al.

(10) Patent No.: US 9,919,976 B1
(45) Date of Patent: Mar. 20, 2018

(54) SOIL CONDITIONERS AND METHOD OF MAKING THEM

(71) Applicant: Magic Dirt, LLC, Little Rock, AR (US)

(72) Inventors: Walter Robert Joblin, Jr., Little Rock, AR (US); Richard Ted Sniegocki, Little Rock, AR (US)

(73) Assignee: Magic Dirt Horticultural Products LLC, Little Rock, AR (US)

( * ) Notice: Subject to any disclaimer, the term of this patent is extended or adjusted under 35 U.S.C. 154(b) by 0 days.

(21) Appl. No.: 15/201,738

(22) Filed: Jul. 5, 2016

(51) Int. Cl.
| C05F 11/00 | (2006.01) |
| C05F 3/00  | (2006.01) |
| C05B 17/00 | (2006.01) |
| C05G 3/04  | (2006.01) |
| C09K 17/02 | (2006.01) |

(52) U.S. Cl.
CPC .............. C05B 17/00 (2013.01); C05F 3/00 (2013.01); C05F 11/00 (2013.01); C05G 3/04 (2013.01); C09K 17/02 (2013.01)

(58) Field of Classification Search
None
See application file for complete search history.

(56) References Cited

U.S. PATENT DOCUMENTS

| 1,408,064 | A | * | 2/1922 | Balmer | C05F 3/00 |
| | | | | | 71/13 |
| 2,200,107 | A | * | 5/1940 | Weitz | C05F 3/00 |
| | | | | | 47/DIG. 9 |
| 4,023,954 | A | * | 5/1977 | de Maudave | C05F 1/00 |
| | | | | | 426/1 |
| 6,149,694 | A | * | 11/2000 | Redden, Jr. | C05F 3/00 |
| | | | | | 44/552 |
| 6,299,774 | B1 | * | 10/2001 | Ainsworth | C02F 3/28 |
| | | | | | 210/178 |
| 6,451,589 | B1 | | 9/2002 | Dvorak | |
| 6,521,129 | B1 | * | 2/2003 | Stamper | C05F 3/00 |
| | | | | | 210/603 |
| 6,811,701 | B2 | * | 11/2004 | Wilkie | C02F 3/101 |
| | | | | | 210/196 |
| 7,794,601 | B1 | * | 9/2010 | Lima | B01D 15/00 |
| | | | | | 210/688 |
| 8,361,186 | B1 | * | 1/2013 | Shearer | C05F 5/00 |
| | | | | | 252/373 |
| 9,382,166 | B1 | | 7/2016 | Joblin, Jr. et al. | |
| 2012/0125064 | A1 | * | 5/2012 | Joseph | C05C 9/02 |
| | | | | | 71/27 |
| 2012/0272700 | A1 | * | 11/2012 | Nevin | C05C 9/005 |
| | | | | | 71/12 |
| 2014/0033776 | A1 | * | 2/2014 | Josse | C02F 1/20 |
| | | | | | 71/10 |

* cited by examiner

Primary Examiner — Wayne Langel
(74) Attorney, Agent, or Firm — Joe D. Calhoun

(57) ABSTRACT

Soil conditioner compositions including manure-based organic fibers, pyrolytically processed into biochar. Also included are soil amendment compositions including growth factors such as nitrogen, phosphorus and potassium available for plants. Those growth factors may be obtained from the further processing of a liquid portion effluent resulting from heat-agitated anaerobic digestion of manure used to produce the fibers for the manure-based soil conditioner.

14 Claims, No Drawings

SOIL CONDITIONERS AND METHOD OF MAKING THEM

CROSS REFERENCE TO RELATED APPLICATIONS

This application is a continuation-in-part application of, and claims the benefit of the filing date of, U.S. Utility patent application Ser. No. 14/686,730 filed 14 Apr. 2015, which will issue as U.S. Pat. No. 9,382,166 on 5 Jul. 2016 and which is incorporated here.

FEDERALLY SPONSORED RESEARCH AND DEVELOPMENT

Not applicable.

MICROFICHE APPENDIX

Not applicable.

BACKGROUND OF THE INVENTION

(1) Field of the Invention

The invention disclosed herein generally relates to soil conditioners and amendments, and processes for making them. More particularly, the present invention relates to manure-based biochar soil conditioners, and to soil amendments resulting from the blending of manure-based nutrients with such manure-based biochar soil conditioner(s).

(2) Background of the Invention

Nutrient-filled soil amendments, also known as potting soil in some contexts, are not mere combinations of fertilizers and filler material. Fertilizers typically are classified and gauged by their relative amounts and ratios of known growth-enhancing elements and compounds such as nitrogen, phosphorus and potassium. Soil amendments strive to achieve a particular balance between those elements and other materials and characteristics that may enhance plant growth under particular conditions. Other characteristics to be considered under particular circumstances may include the physical and chemical characteristics of the native soil of the ecosystem being treated, and the characteristics of additives that may be applied along with known growth enhancing elements. Besides the nutrient component, soil amendments often strive to address characteristics such as soil porosity, acidity (pH) and water retention capability.

There are many fertilizers and soil amendments known in the field. Although most have similar complements of the basic nutrients, there is variation in the amounts and ratios of both basic and not-so-basic nutrients, and other elements such as those that affect the ability of the soil to retain moisture and nurture plant growth. FIG. 1 is a listing of nine of the leading premium potting soils.

Peat moss has been the traditional substratum for soil amendments. However, peat moss has become more expensive, its harvesting is not ecological, and it has extremely slow regenerative capabilities (up to 20 years to regenerate a peat moss bog after harvesting). Accordingly, a substitute substratum has been sought for a number of years.

Within the last decade or so, processed animal waste, primarily cattle and chicken manure, was considered as a possible source of fertilizer and/or substitute substratum. Although some such processed waste has uses as fertilizer, its overuse as such has resulted in eutrophication of ponds and water sources. Attempts were also made to use fibers obtained from digested manure as substitute substratum. One such digestion process was patented in U.S. Pat. No. 6,451,589 issued to Dvorak (the "589 Patent"), for a method and apparatus for processing high-solids organic waste material such as cattle manure. (The invention disclosed herein uses fibers obtained from a digestion process that differs from the '589 Patent process in a few important steps.) A company named GroMoor (no longer believed to be in business) attempted to use fibers obtained from the '589 Patent process, as a soil amendment. A company named Organix also uses fibers obtained from the '589 Patent process (or a process very similar thereto), as a soil amendment; it is believed that the only other processing involves adding citric acid to such fibers.

Also known in the field is a product produced by Miller Companies that was believed to be initially made from fiber similar to that component of the disclosed composition; however, that product was comprised of less than ten percent (10%) of such fiber (less than one-seventh ($1/7^{th}$ the amount of fiber used in the disclosed composition), while the remaining 90% of matter included Sphagnum peat moss, and perlite.

More recently, researchers have begun experimenting with material processed much like charcoal that mixes with soil to provide structural and/or functional characteristics that enhance plant growth. When the raw materials being processed for such soil conditioners are organic in origin, they are sometimes called biochars. Biochars vary widely in pH, surface area, nutrient concentration and porosity dues to the assortment of feedstock material and thermal conversion conditions under which it is formed. Traditionally, most biochars have been made from woody biomass. For soil conditioners disclosed herein, the feedstock typically used is animal manure (cow, pig, chicken, turkey), either raw (wet or dried) or processed in an anaerobic digester. The feedstock is heat treated through pyrolysis. Pyrolysis is the thermal, conversion of organic feedstocks for the generation of energy through which leftover material, commonly referred to as biochar, is created. Pyrolysis of biomass feedstock typically occurs at temperatures ranging from at least 300° C. to less than 700° C. under a low oxygen condition. Biochar alone has the ability to improve soil health due to its elemental composition and ability to improve pH, retain moisture in its porous surface and bind nutrients.

Soils conditioned with stable forms of biochar increase the size of carbon pools and long-term carbon sequestration. To make biochar conditioners more consistently beneficial, Novak et. Al. theorized that biochar could be engineered through single or multi-feedstock selection, blending feedstocks, choosing appropriate physical states (e.g., pellets and dust), and modifying pyrolysis temperatures, to produce biochar materials that target specific soil health characteristics. (Novak J M, Lima I, Xing B, Gaskin J W, Steiner C, Das K C, Ahmedna M, Rehrah R, Watts D W, Busscher W J, Schomberg (2009) *Characterization of designer biochars produced at different temperatures and their effects on a loamy sand*. Ann Environ Sec 3; 195-206; Novak J M, Busscher J W (2012) *Selection and use of designer biochars to improve characteristics of southeastern USA Coastal Plain degraded soils*. In: Lee J W (ed) Advanced biofuels and bioproducts. Springer Science, New York, pp 69-97.) By contrast, the inventions disclosed herein involve a different charring process using novel and nonobvious materials;

moreover, the soil conditioners disclosed herein may also include nutrients added after the charring process.

BRIEF SUMMARY OF THE INVENTION

In general, the invention disclosed herein includes (comprises) proprietary soil conditioners and soil amendments, and proprietary processes for making them. More particularly, the disclosed invention includes manure-based biochar soil conditioners, and manure-based soil amendments including proprietary plant nutrients blended with proprietary manure-based biochar.

The organic waste (mostly dairy manure) goes into the mixed plug flow anaerobic (without air/sealed) digester as a 12% solid solution. The other 88% is a combination of water and urine. While in the digester, the organic waste is kept at a constant 100 degrees and constantly agitated to speed up the digestion. When the waste exits the digester, the organic solids and liquids are separated. The solids (containing long, anaerobically digested fiber) make up the primary component to be "charred" though pyrolysis to become the proprietary biochar soil conditioner. The liquids contain shorter fiber that can be aggregated, processed, and added to a biochar to provide the resulting soil amendment with the desired nutrient profile.

The heat treatment involved in anaerobic digestion kills all weed seeds in the organic waste (making the fiber distinguishable from compost). Also, the digested fiber is virtually pathogen free (another distinguishing difference from compost).

Ideally, the biochar soil conditioner is mixed with plant nutrient derived from the liquid portion of the effluent byproduct of the anaerobic digestion process disclosed herein and in U.S. Pat. No. 9,382,166 (the "'166 Patent").

The present invention also relates to a proprietary process that creates a variety of engineered soil conditioners, and to a proprietary process that creates a variety of engineered soil amendments by blending of plant nutrients with proprietary manure-based biochar(s). Even more specifically, the invention disclosed herein includes (comprises) fibers obtained from anaerobically digesting organic waste such as manure (protected by the 166' Patent), used in a proprietary process to produce a biochar that may then be combined with additional plant nutrients derived from the liquid portion effluent of the anaerobic digestion process disclosed herein and in the '166 Patent.

A principal object of the current disclosure is to provide a soil conditioner having the optimal amount of nutrient rich carbon residue.

Another object of this disclosure is to provide a soil amendment having the optimal amount(s) of growth enhancing nutrient(s).

Another object of the current disclosure is to provide a soil conditioner having high water retention capabilities, and high porosity.

Another object of the current disclosure is to provide a soil conditioner engineered to satisfy the characteristics of a desired soil conditioner for inclusion with native soil needing such characteristics.

Another object of the current disclosure is to provide a soil amendment engineered to have the nutrient profile for plant growth needing such nutrient(s).

Another object of the current disclosure is to provide soil conditioners and soil amendments that are pathogen-free.

Yet another object of the current disclosure is to provide soil conditioners and soil amendments qualifying as certified organic, that is environmentally friendly with sustainable ingredients.

BRIEF DESCRIPTION OF THE DRAWINGS

The novel features believed characteristic of the disclosed subject matter will be set forth in the claims. The disclosed subject matter itself, however, as well as a preferred mode of use, further objectives, and advantages thereof, will best be understood by reference to the specification.

DETAILED DESCRIPTION OF ILLUSTRATIVE EMBODIMENTS

For the sake of simplicity and to give the claims of this patent application the broadest interpretation and construction possible, the following definitions will apply:

The term "soil conditioner" or derivative thereof essentially means a substance added to or mixed with soil to, among other things, improve the physical characteristics of the soil such as providing a nutrient rich carbon residue structure, for enhancing plant growth conditions; a soil conditioner may include a soil amendment as a component.

The term "soil amendment" or derivative thereof essentially means a substance added to or mixed with soil to, among other things, provide plant growth nutrients and other growth factors; a soil amendment may include a soil conditioner as a component.

The term "manure" essentially means the solid or semi-solid excrement of any species of animal, particularly cows, pigs, chickens, and/or turkeys.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprising", "including" or "having", and any derivative of any of those terms, when used in this specification, specify the presence of stated, features, regions, integers, steps, operations, elements, and/or components, but do not preclude the presence or addition of one or more of the same.

Similarly, the invention is not limited to any particular embodiment described or depicted herein. For example, other versions than those specifically disclosed herein will suffice, so long as each embodies the required elements or limitations.

In general, the invention disclosed herein includes (comprises) a combination composition for adding plant growth factors to soil, comprising a combination of long organic fibers comprising nitrogen, phosphorus and potassium available for plants. The fibers may be the end product of slow, heat-agitated anaerobic digestion of manure. Most of the fibers may have a length in the range of between about 2 inches to about 0.25 inch. A significant proportion of fibers have an average length of greater than 1 inch; this length is longer than the prior art, and it provides greater porosity and less compaction of the soil conditioner. Most of the remainder have a length in the range of between about 1 inch and 0.25 inch; the higher lengths are longer than the prior art as well. The vast majority of fibers have a thickness in the range of between about $1/16^{th}$ inch to $1/32^{nd}$ inch, typically thinner than bedding straw but thicker than composted bedding material on the market. Any further processing such as barrel composting, barrel drying, or mechanical pressing will result in fibers of shorter length, which will result in a product having lower porosity.

The fibers may be the end product of slow, heat-agitated anaerobic digestion of manure, followed by screen separation and/or free-fall heated-air drying.

The soil, conditioner includes pyrolytically processed manure (natural or dried) or fibers derived from a proprietary process for slow anaerobic digestion of manure.

The soil amendment includes the biochar soil conditioner, in combination with a source of plant nutrients. Ideally, the source of plant nutrients is manure, especially cow, pig, chicken or turkey manure. Preferably, the source of plant nutrients is derived from the liquid portion effluent of the anaerobic digestion process disclosed herein and in the '166 Patent.

Unlike composted fibers, the digested fiber has a longer fiber length, which creates good air porosity. This gives the fiber a spongy quality with the ability to retain more than three times its weight in water for improved moisture control. Moreover, no weeds developed in tests. The fiber contains sufficient amounts of total nitrogen (N), available phosphate ($P_2O_5$) and soluble potash ($K_2O$) to promote good root development and plant growth. Importantly, the fibers are pathogen-free.

Unlike many other premium potting soils, the disclosed, soil conditioners and amendments do not contain unsustainable ingredients such as peat moss, coir, vermiculite or perlite; neither do they release pollutants when harvested, as does peat moss harvesting. Similarly, the fiber of the disclosed composition can be produced within a month, whereas the average time for a peat moss bog to regenerate after harvesting is about 20 years. The disclosed composition is certified "organic", and certified "bio-based".

Tests have been performed on typical batches of the composition claimed in the '166 Patent. In one independent testing of such a batch, measurements made at container capacity reflect conditions in a 6-inch soil column that had been saturated and allowed to drain to equilibrium. It was found that there was air space of 12.7%. Water retention was abundant at 58.4% media volume, equivalent to 3.5 times its dry weight. Particle size distribution analysis showed that 92% of particles passing a 0.25 inch screen; and only 31% of particles passed the through the 0.5 mm screen. The composition had a hydration index, of 0.81. The saturated bulk density was 54.6 pounds per cubic foot (1475 pounds per cubic yard), which is toward the light end of the range usually specified for media proposed for on-structure use. The organic content was 75% by weight.

Chemical suitability characteristics for the composition claimed in the '166 Patent showed a slightly acidic pH and, with lime absent, this is in the range preferred by most types of plants. Salinity and sodium levels were safely low, and the SAR value shows soluble sodium adequately balanced by calcium and magnesium. The majority of nitrogen available for plant uptake was in the preferred nitrate form. About 96% of the total nitrogen was organic, and there was a carbon-to-nitrogen ratio of 29.6, indicating that there was plentiful nitrogen to compensate for further organic decomposition.

Available iron was fair for the composition claimed in the '166 Patent, and all of the other required nutrients were well supplied. Particularly abundant were phosphorus, potassium, magnesium, sulfate, zinc and manganese. FIG. 1 is a chart comparing the standard nitrogen-phosphorus-potassium content of 9 leading premium potting soils, and the plant soil conditioner disclosed herein. FIG. 2 summarizes the nutrients of the tested batch.

Besides the soil conditioners and soil amendments described herein, the disclosed invention includes the method of making each. For the fibers for the biochar soil conditioner, the process for making the fibers is a variant of the process disclosed in U.S. Pat. No. 6,451,589 issued to Dvorak (the "589 Patent") for a method and apparatus for processing high-solids organic waste material such as cattle manure. Total process flows of waste materials are controlled in substantially-closed systems, and subjected to a lengthy process involving relatively slow agitation and movement of waste along a long enclosed digester under continuous heat. A digester for processing high-solids waste is provided comprising a mixing chamber, a clarifier, and a generally U-shaped digester. There is a mixing chamber located adjacent a heated digester chamber, where thermal agitation of the waste causes controlled mixing of wastes in the digester.

In the operation of the waste-processing system, unprocessed cow manure is transferred to the mixing chamber, where the manure is mixed with activated sludge (essentially some of the liquid fraction saved from the previous digestion/processing of manure). That sludge-like mixture is heated to approximately 105 to 130 degrees Fahrenheit. (Heavy solids such as grit fall to the bottom of the mixing chamber under the influence of gravity and are removed using an auger in the bottom of the mixing chamber, and transferred to a disposal site.) After a stay of approximately one day in the mixing chamber, the sludge flows through an opening in the wall separating the mixing chamber and the digester, where anaerobic digestion takes place. The activated sludge added to the manure in the mixing chamber serves to start the anaerobic digestion process.

The digester is essentially a long, enclosed chamber having a center wall running most of the length of the chamber, thereby forming a U-shape digestion pathway; the digester has a long sludge flow path, and thus a long residence time of approximately twenty days. As the sludge flows through the digester, anaerobic digestion processes the manure sludge into activated sludge.

From the digester, the activated sludge flows into a clarifier chamber. The clarifier uses gravity to separate the activated sludge into liquid and solid portions. Under the influence of gravity and separation panels, the liquid portion rises to the top of the mixture and is decanted away. This effluent contains relatively small solids such as short fibers, which can be aggregated and removed by further processing (especially the M-DAF processing described, below for the soil amendment). The solids portion of the activated sludge settles to the bottom of the clarifier. This contains the longer fibers that are the fibers for the composition claimed in the '166 Patent, and the fibers for some of the soil conditioner described herein. Sometimes the solids are subjected to mechanical press processing to reduce the moisture content; however, such processing is not typically recommended for the disclosed composition, because that will reduce the length of fibers unnecessarily. Unlike the '589 Patent and other known prior art, most of the activated sludge is removed from the clarifier and is processed through a screen separator; at this point, the moisture content is reduced to between about sixty-five to seventy percent.

The fibers of the '116 Patent may have a second processing step not disclosed in the '589 Patent, namely, an additional step of heat drying the fibers while they are free-falling. The fibers of the present invention may be transported to approximately 15 to 20 feet above the ground level, then pumped out into the air and through an airstream having a temperature of approximately 100 degrees Fahrenheit. This aerates and separates the fibers, and causes them to dry as they descend. It also provides the fibers with a more airy, fluffy consistency, which allows further drying after free-fall drying. Although the fibers may have a variety of lengths, typically they are in the range of between about 1.5 inch and about 0.25 inch long; a significant portion have a length of over 1 inch. This is relatively long for materials used for soil conditioners or amendments.

Moreover, unlike the '589 Patent, the fibers of the present invention do not undergo any further composting (and consequent aerobic digestion), nor are they subjected to any mechanical press.

To produce a soil conditioner, the fibers disclosed herein undergo a pyrolytic heating process known as "charring". Pyrolysis of biomass feedstock typically occurs at temperatures ranging from at least 300° C. to less than 700° C. under a low oxygen condition. The proprietary manure-base biochar disclosed herein, produced at lower pyrolysis temperatures, will retain some organic carbon structure that can be decomposed by soil microbes. The proprietary biochars disclosed herein, are produced at temperatures ranging from at least about 350° C. to about 700° C.

For the production of the proprietary soil conditioners disclosed herein, a specially adapted pyrolysis technique is used to create the biochar from manure, or from materials made from the special processing of manures disclosed herein. The result is a soil conditioner having a novel, nutrient-rich carbon residue substantially different in nutrient content from known biochar products using woody biomass as feedstock. Most of the proprietary biochar soil conditioners disclosed herein make excellent carriers for introduction of microbes into the soil, to increase fertility of soils; they have a variety of uses, including enhancing soil fertility, seed germination, plant growth and productivity.

The following are just a few examples of ways to blend "designer biochar", designed to have nutrient profiles and physical characteristics desire for particular needs or purposes:

| Biochar | Other nutrients | N | P | K |
|---------|-----------------|------|-----|------|
| 80% | 20% | 7.21 | 3.8 | 5.01 |
| 5% | 95% | 1.68 | 1.4 | 1.03 |
| 10% | 90% | 2.05 | 1.4 | 1.02 |
| 5% | 95% | 3.88 | 1.0 | 1.03 |
| 10% | 90% | 4.88 | 1.3 | 0.91 |

For one exemplary manure-based biochar soil conditioner made from the fibers of the composition disclosed in the '166 Patent, the nutrient content of the biochar is:

(1) total nitrogen in the range of about 0.58% to about 0.88% by weight;

(2) phosphorus (as $P_2O_5$) in the range of about 0.73% to about 3.4% by weight; and (3) soluble potassium (as $K_2O$) in the range of about 1.49% to about 2.30% by weight.

The pyrolysis technique used to create the biochar includes using an enclosed gasification vessel that chars the batch of manure/fiber while generating heat to continue the process. After the desired amount of heating, the vessel may be clean out and a new batch of manure/fiber added for pyrolytic processing.

The proprietary soil conditioner manufacturing process disclosed herein may also include adding nutrients after the charring process. These nutrients may be recovered from the smaller solids suspended in the liquid portion of the effluent remaining after the modified anaerobic digestion process used to produce the fibers included in the composition patented in the '166 Patent, wherein the manure is treated for approximately 21 days in a two-stage mixed plug-flow anaerobic digester. The remaining post-digester pathogen-free solids are then available for nutrient recovery and addition to the proprietary biochar disclosed herein.

The nutrients may be recovered from the post-digestion liquid portion through a process known as the modified Dissolved Air Floatation (M-DAF) system or process. A typical DAF process clarifies wastewaters (or other waters) by the removal of suspended matter such as oil or solids, by dissolving air in the wastewater under pressure and then releasing the air at atmospheric pressure in a flotation tank basin; the released air forms tiny bubbles which adhere to the suspended matter, causing the suspended matter to float to the surface of the water where it may then be removed by a skimming device. The M-DAF method employs an organic, digestible polymer to flocculate the waste; and it does not require any metal salts to be effective. For example, the digestible polymer may be a starch derived from potato has been used, which will be digested by soil microbes so that no residue will remain. Digestible polymers from vegetable or other natural organic sources allow the soil amendment to be classified as certified organic.

One soil amendment disclosed herein produces super concentrated nutrient levels, that can be released over time to revitalize soils depleted in nutrients. Such nutrient levels include;

(a) total nitrogen of about 7.2% by volume;

(b) phosphorus (as $P_2O_5$) of about 3.8% by volume; and (c) soluble potassium (as $K_2O$) of about 5.0% by volume.

Another way of mixing the nutrients and biochar produces a soil amendment with levels of nutrients favoring blooming and fruit production rather than soil revitalization. These mixtures would vary, depending on the intended use: generalized plant food, vegetables, blooming plants, etc. in smaller spaces, containers and pots. The overall nutrient levels could range between:

(a) total nitrogen of about 2.5% to about 5.3% by volume;

(b) phosphorus (as $P_2O_5$) of about 1.0% to about 1.40% by volume; and (c) soluble potassium (as $K_2O$) of about 0.91% to about 1.03% by volume.

Field application for plant growth would typically be through top dressing the soil with the combined biochar soil conditioner and nutritious amendment, and then tilling to allow it to work its way into the root zone, resulting in more porosity, nutrient release and moisture control for plant growth.

A third application is to combine the biochar and nutrients with native soil to improve lawns, by applying it either under the sod (when first planting) or with a spreader through aeration/thatching. The long-term presence in the ground of the combined soil conditioner and amendment will provide long-lasting porosity, moisture retention and grass growth. The overall nutrient levels for best results would be:

(a) total nitrogen of about 5% by volume;

(b) phosphorus (as $P_2O_5$) of about 1% by volume; and (c) soluble potassium (as $K_2O$) of about 1% by volume.

In the processing for the proprietary soil amendment disclosed herein, much of the organic nitrogen (N) in the waste is converted to inorganic ammonia, yielding an effluent with 60-80% of the N as ammonia. Ammonia application for crop growth can be more accurately managed than traditional organic N, especially when mixed with biochar. The organic N must be freed from its organic molecules (mineralized), by natural soil bacteria in the soil substrate, to be available for plant use as inorganic N. The processing for the proprietary soil amendment disclosed herein provides an 80-90% recovery of phosphorous. When combined with the proprietary biochar disclosed herein, the proprietary soil amendment holds the nutrients in the soil, preventing them from being washed away by rain or irrigation.

The proprietary soil conditioners and amendments disclosed herein are resistant to plant pathogens, molds and mildews which have been found in flowering plants and vegetables.

The disclosed combination composition is suitable for growing seeds in pots, transplanting seedlings, use in container gardens and hanging baskets, or to mix with outdoor soil to keep the soil loose and moist while adding additional naturally occurring nutrients for vigorous plant growth.

Besides the soil conditioners and amendments disclosed herein, the invention also includes the process of making the same, as disclosed herein.

We claim:

1. A composition of matter for promoting plant growth in soil, said composition comprising organic fibers produced by the pyrolytic processing of manure into biochar, said pyrolytic processing comprising heating manure at temperatures in the range of between about 350° C. and 700° C., for a duration in the range of between about 5 hours to about 8 hours.

2. The composition of claim 1, said pyrolytic processing comprising heating natural manure at about 700° C. for about 8 hours.

3. The composition of claim 1, said pyrolytic processing comprising heating dried natural manure having a moisture content in the range of about 65% to about 75%, at about 500° C. for about 6 hours.

4. The composition of claim 1, said organic fibers having a length longer than one-half inch and comprising nitrogen, phosphorus and potassium available for plants.

5. The composition of claim 1, further comprising plant growth factors added after said pyrolytic processing.

6. The composition of claim 5, said growth factors produced from a liquid portion effluent resulting from heat-agitated anaerobic digestion of manure and yielding said liquid portion effluent including smaller solids, said growth factors produced from further processing said liquid portion by dissolving air therein under pressure and then releasing the air at atmospheric pressure in a flotation tank basin causing the suspended matter to float to the surface where it may then be collected by a skimming device.

7. The composition of claim 6, said further processing comprising adding organic digestible polymer to said liquid portion.

8. The composition of claim 6, said liquid portion comprising growth factors having nutrient levels comprising:
(a) total nitrogen of about 7.2% by volume;
(b) phosphorus (as $P_2O_5$) of about 3.8% by volume; and
(c) soluble potassium (as $K_2O$) of about 5.0% by volume.

9. The composition of claim 6, said liquid portion comprising growth factors having nutrient levels comprising:
(a) total nitrogen of about 2.5% to about 5.3% by volume;
(b) phosphorus as $P_2O_5$ of about 1.0% to about 1.4% by volume; and
(c) soluble potassium as $K_2O$ of about 0.91% to about 1.03% by volume.

10. The composition of claim 6, said liquid portion comprising growth factors having nutrient levels comprising:
(a) total nitrogen of about 5% by volume;
(b) phosphorus as $P_2O_5$ of about 1% by volume; and
(c) soluble potassium as $K_2O$ of about 1% by volume.

11. A composition of matter for promoting plant growth in soil, said composition comprising organic fibers produced by the pyrolytic processing of fibers selected from the group consisting of natural manure fibers, dried natural manure fibers, fibers comprising the end product of heat-agitated anaerobic digestion of manure, and combinations and mixtures thereof, said pyrolytic processing comprising heating the fibers at temperatures in the range of between about 350° C. and 700° C., for a duration in the range of between about 5 hours to about 8 hours.

12. A composition of matter for promoting plant growth in soil, said composition comprising organic fibers produced by the pyrolytic processing of manure into biochar, said pyrolytic processing at about 400° C. to about 500° C. for about 6 to about 7 hours, wherein the fibers which are heated comprise heating fibers comprising the end product of heat-agitated anaerobic digestion of manure for about 19 to about 21 days at about 99° F. to about 105° F.

13. The composition of claim 12, said pyrolytic processing comprising heating the fibers at about 400° C. to about 500° C. for about 6 hours, wherein the fibers which are heated comprise the end product of heat-agitated anaerobic digestion of manure for about 20 days at about 100° F.

14. The composition of claim 13, said pyrolytically processed organic fibers comprising:
(a) total nitrogen in the range of about 0.58% to about 0.88% by volume;
(b) phosphorus as $P_2O_5$ in the range of about 0.73% to about 3.4% by volume; and
(c) soluble potassium as $K_2O$ in the range of about 1.49% to about 2.30% by volume.

* * * * *